Aug. 18, 1959
F. M. PATTON
2,900,198
POLE TRAILER
Filed April 4, 1958
3 Sheets-Sheet 1
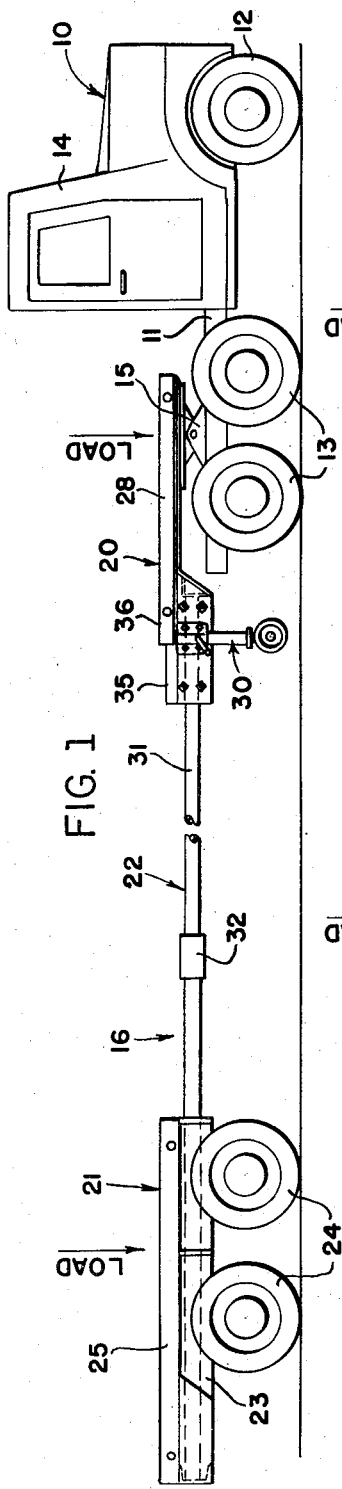
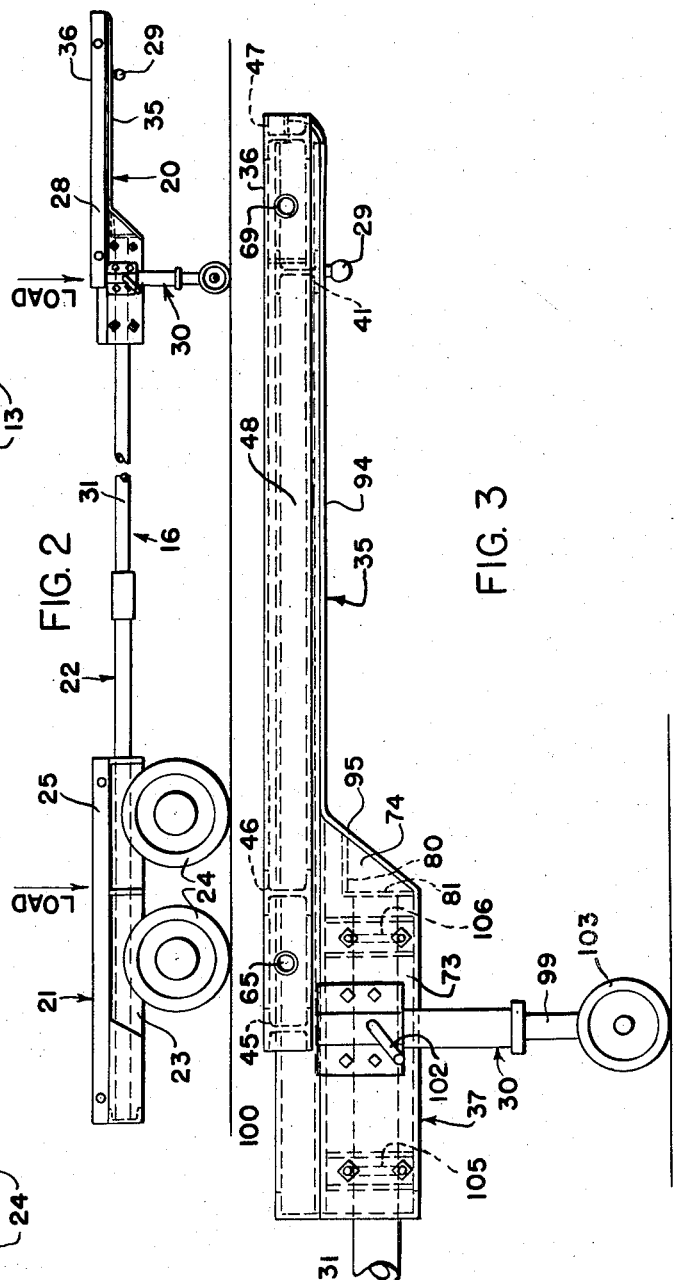
INVENTOR.
FRANK M. PATTON
BY
ATTORNEY Aug. 18, 1959  F. M. PATTON  2,900,198
POLE TRAILER
Filed April 4, 1958  3 Sheets-Sheet 2
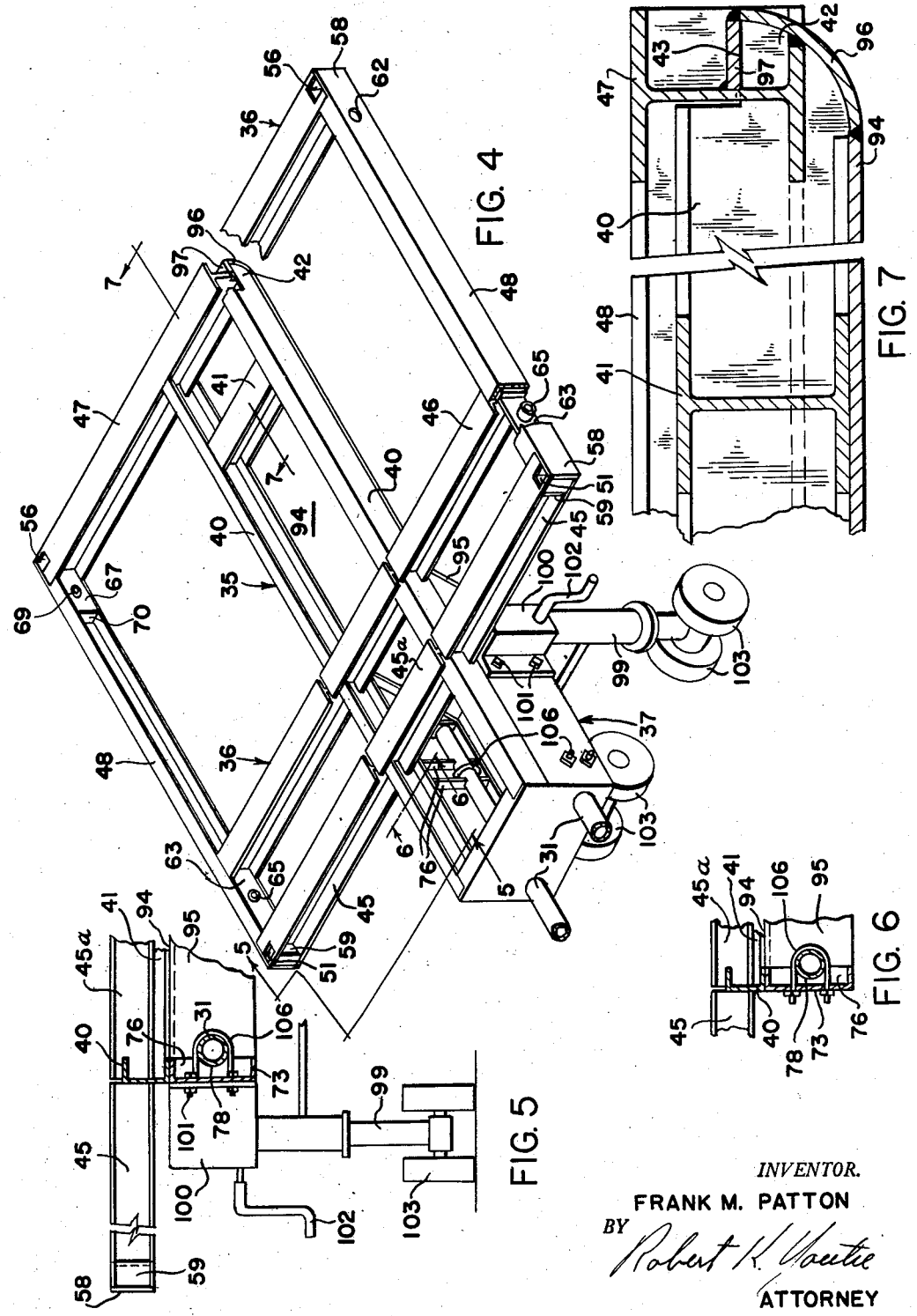
INVENTOR.
FRANK M. PATTON
BY
Robert K. Youtie
ATTORNEY Aug. 18, 1959     F. M. PATTON     2,900,198
POLE TRAILER
Filed April 4, 1958     3 Sheets-Sheet 3
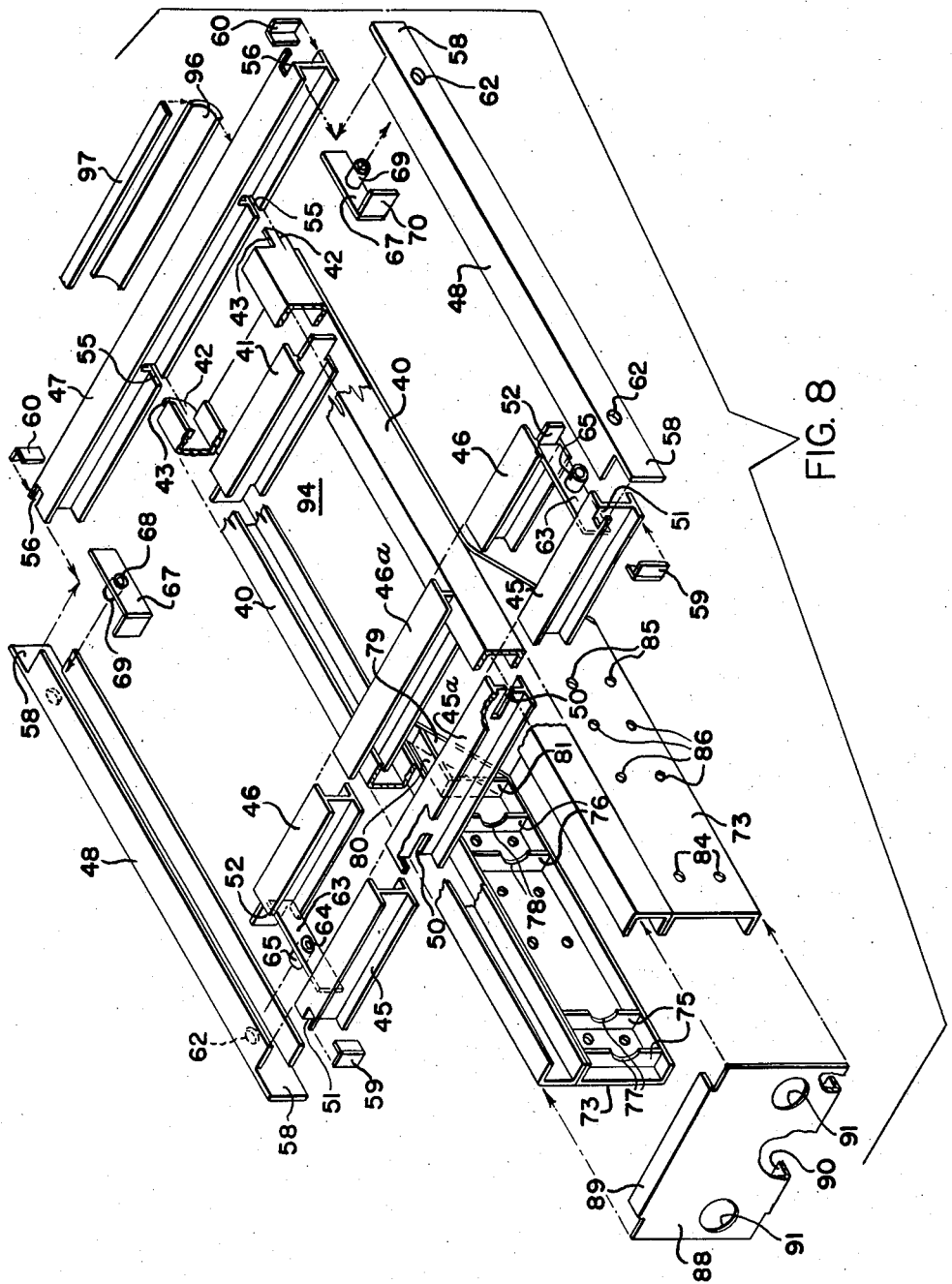
INVENTOR.
FRANK M. PATTON
BY
ATTORNEY United States Patent Office 2,900,198
Patented Aug. 18, 1959

2,900,198

POLE TRAILER

Frank M. Patton, Thorofare, N.J.

Application April 4, 1958, Serial No. 726,522

4 Claims. (Cl. 280—404)

This invention relates generally to improvements in tractor-trailer vehicles, and is particularly concerned with novel structural features of a load carrying trailer for attachment to a tractor.

It is one object of the present invention to provide a trailer construction which is well adapted for carrying extremely heavy loads, and wherein the loaded trailer is adapted to be easily and quickly attached to and detached from a tractor, so that the tractor is not unnecessarily immobilized during the trailer loading and unloading operation.

It is another object of the present invention to provide a trailer construction of the type described which includes means for adjusting the trailer length, as is desired for carrying different loads.

It is a further object of the present invention to provide a trailer having the advantageous features mentioned in the preceding paragraphs, which is staunch and rugged in construction, relatively light in weight, durable and trouble-free over a long useful life, and which can be economically manufactured, maintained and operated.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a side elevational view showing a tractor assembled with a trailer constructed in accordance with the teachings of the present invention, the trailer being broken away to conserve drawing space;

Figure 2 is a side elevational view showing the trailer of Figure 1 in its condition detached from the tractor, and partly broken away;

Figure 3 is a side elevational view showing a forward part of the trailer of Figures 1 and 2, somewhat enlarged to show greater detail;

Figure 4 is a top, rear perspective view showing the trailer of Figure 3, with parts broken away for clarity of understanding;

Figure 5 is a partial sectional elevational view taken substantially along the line 5—5 of Figure 4;

Figure 6 is a fragmentary sectional elevational view taken substantially along the line 6—6 of Figure 4;

Figure 7 is a longitudinal, sectional elevational view taken substantially along the line 7—7 of Figure 4, somewhat enlarged for greater clarity and broken away for conservation of drawing space; and Figure 8 is a perspective view similar to that of Figure 4, but showing certain of the elements exploded and broken away for clarity of understanding.

Referring now more specifically to the drawings, and particularly to Figure 1 thereof, there is illustrated therein a conventional tractor, generally designated 10 having a longitudinally extending main frame or chassis 11 carrying ground engageable front wheels 12 and rear wheels 13. The forward portion of the tractor 10 may include a cab 14, as illustrated, and there is mounted on the rear end portion of the tractor a conventional fifth wheel structure 15. Connected to and extending rearward from the tractor 10 is a trailer 16 constructed in accordance with the present invention.

The trailer 16 includes a forward part, generally designated 20, adapted for connection to the fifth wheel structure 15, a rearward part, generally designated 21 which is spaced rearward from the forward part, and an interconnecting part 22 extending longitudinally between and having its opposite ends connected to the forward and rearward parts.

The rearward trailer part 21 may be considered as constituted of a truck or undercarriage 23 which carries on its underside ground engageable wheels 24. Superposed on the truck 23 is a generally horizontally disposed load carrying structure or frame 25.

The forward trailer part 20 includes a front, generally horizontal load carrying structure or frame 28 which is similar in most respects to the rear frame 25. Depending from a forward region of the front frame 28 is a pin or coupling element 29, see Figure 2, for detachable coupling engagement in the fifth wheel structure 15, as in the condition of Figure 1. Adjacent to the rear part of the frame 28, and depending therefrom, is a ground engageable, preferably wheeled, landing gear 30. The landing gear 30 is advantageously selectively movable vertically between its upper or retracted position of Figure 1 and its lower, extended position of Figure 2.

The front and rear part connecting means 22 preferably consists of a pair of generally horizontal, longitudinally extending, laterally spaced poles 31 having their forward and rearward ends respectively connected to the front and rear trailer parts 20 and 21, and disposed below the upper surfaces of the front and rear trailer parts. The poles 31 are preferably longitudinally extensile and retractile for varying the distance between the front and rear trailer parts, and may be of any suitable, adjustable telescopic construction, as indicated somewhat diagrammatically at 32.

As the front and rear load supporting frames 28 and 25 are substantially similar in construction, with the major exception that the rear load supporting frame carries the wheeled truck 23 and that the front load supporting frame carries the coupling element 29 and landing gear 30, it is believed sufficient to illustrate and describe in detail the construction of the front load supporting frame. This is best seen in Figure 4 as including a forwardly and rearwardly or longitudinally extending central structure 35 and a lateral structure 36 carried by and extending laterally outward beyond opposite sides of the central structure. A pole connecting structure 37 is carried on the underside of the central structure 35 at the rearward region thereof, and the coupling element 29 (see Figures 2 and 3) is carried on the underside of the central structure at the forward region thereof. More specifically, the central structure 35 includes a pair of longitudinally extending, laterally spaced structural members or channels 40, which are rigidly secured together, and preferably arranged facing toward each other. As one part of the central structure 35 securing the channels 40 together there may be a structural member or I-beam 41 extending laterally between the channels, having its upper and lower flanges substantially flush with the channel flanges and its intermediate web extending at opposite ends into the respective channels. The I-beam 41 may be welded or otherwise fixedly secured to the channels 40, as desired. As best seen in Figure 8, it may be observed that the forward ends of channels 40 are cut or otherwise formed with the lower portions of their generally vertically disposed webs projecting forward, as at 42, to define a pair of laterally spaced, upwardly facing shoulders 43 located vertically between the lower and upper channel flanges.

The laterally extending structure 36 is defined by a plurality of structural members or I-beams 45, 46 and 47 extending laterally outward from and beyond opposite sides of the central structure 35. In particular, the rearward laterally extending structural member 45, as well as the next adjacent or longitudinally intermediate laterally extending structural member or I-beam 46, may be of a three-part or sectional construction, as best seen in Figures 4 and 8. However, the forward laterally extending structural member or I-beam 47 is preferably of an integral or unitary construction. The laterally extending structure 36 also includes a pair of longitudinally extending, laterally outer structural members or channels 48, each rigidly connected to the adjacent laterally outer ends of the laterally extending I-beams 45, 46 and 47. As best seen in Figures 3 and 4, the structural members 45, 46, 47 and 48 are all generally horizontal and substantially coplanar, having their upper surfaces generally flush and located in a plane spaced above the plane of the central structure channels 40.

In greater detail, the rear laterally extending structural member 45 may be formed in three sections, having its central or intermediate section 45a extending laterally between the channels 40 of central structure 35 and formed with end notches or slots 50 in its vertical web (see Figure 8) receiving the upper flanges of channels 40. In this interfitting relationship, the intermediate section 45a of rear structural member 45 is welded or otherwise fixedly secured to the channels 40. The outer or end sections of structural member 45 are fixedly secured, as by welding or otherwise, to respective channels 40 and extend laterally outward in opposite directions therefrom, being disposed in end to end adjacent relation with opposite ends of the section 45a and in substantial alignment with the latter section and each other. The upper flange of each end section of structural member 45 is formed with a cut out 51 extending inward from its outer end, rearward of and substantially flush with the vertical web.

The laterally extending structural member 46 is similar to the structural member 45, and includes an intermediate section 46a extending between and notched for interfitting engagement with the channels 40. The intermediate section 46a thus has its upper surface spaced above the upper surfaces of the channels 40, and is fixedly secured to the latter, as by welds or otherwise. The laterally outer or end sections of the structural member 46 are fixedly secured to, as by welding or otherwise, respective channels 40, in adjacent aligned end to end relation with respective ends of the central section 46a, and extend laterally outward from the channels. The outer ends of the structural member or I-beam 46 are cut or otherwise formed to provide portions of the vertical web, as at 52, extending laterally outward beyond the flanges for insertion into respective longitudinal outer channels 48, as will appear presently.

The forward laterally extending structural member 47 may be an integral or unitary I-beam provided with a pair of laterally spaced, downwardly opening cut outs or slots 55 each receiving a respective channel web extension 42, as in the broken away illustration of Figure 4. In the assembled condition, the forward laterally extending structural member or I-beam 47 thus seats on the upwardly facing edges or shoulders 43 of the extensions 42, and is preferably fixedly secured to the latter, as by welding or the like. The outer ends of the laterally extending structural member 47 are formed with cut outs 56 each extending inward in the upper flange forward of and substantially flush with the vertical web of the structural member.

Each of the outer, longitudinally extending structural members 48 is defined by an inwardly facing channel having the end portions of its flanges cut away to define web extensions 58. By this construction, the outer ends of the laterally extending structural member 45 are welded or otherwise fixedly secured in abutting engagement with the inner sides of the rearward web extensions 58, and the laterally outer ends of the laterally extending forward structural member 47 are welded or otherwise fixedly secured in abutting engagement with the inner sides of the forward web extensions 58. It will now be understood that the rearward web extensions 58 close the laterally outwardly opening side of the cut outs 51, and that the forward extensions 58 close the laterally outwardly opening sides of the cut outs 56. Further, a pair of rear angle pieces 59, each of which may be integrally formed of a bent plate, or built up of plates welded at right angles to each other, are fixedly secured between the flanges of the laterally extending structural member 45 adjacent to the respective cut outs 51, and each combines with the adjacent portions of the extension 58 and web of the laterally extending member to define a generally vertical socket opening upwardly through the associated cut out. Similarly, angle pieces 60 are welded or otherwise fixedly secured between the flanges of the front laterally extending I-beam 47 adjacent to respective cut outs 56, and cooperate with adjacent portions of the front extensions 58 and web of the I-beam to define sockets opening upward through the cut outs 56.

Each of the outer, longitudinally extending members 48 may be provided with a pair of forwardly and rearwardly spaced through apertures or holes 62 formed in its vertical web. A generally vertical plate 63 extends longitudinally between each adjacent pair of outer ends of the laterally extending members 45 and 46, preferably being welded or otherwise fixedly secured to the latter, and located between the flanges of the adjacent outer longitudinally extending member 48, in facing spaced relation with respect to the web of the associated outer longitudinally extending member. Further, each of the plates 63 is formed with a through aperture or opening, as at 64; and, a tube 65 is interposed between each plate 63 and the vertical web of the adjacent outer longitudinal member, and fixedly secured in position there between to open at its opposite ends through the apertures 62 and 64. Similarly, a vertical plate 67 having a through aperture 68 is located on the inner side of in facing, spaced relation with respect to the forward web region of each outer longitudinally extending member 48, and welded or otherwise fixedly secured in such position. A tube 69 extends between each plate 67 and the web of the adjacent longitudinally extending member 48, being fixedly secured in position there between, and having its opposite ends opening through the web aperture 62 and plate aperture 68. For increased rigidity, a vertical, laterally extending plate 70 may be welded or otherwise secured to each plate 67, normal thereto adjacent the rearward end thereof, and extend into abutting engagement with the web of the adjacent outer longitudinally extending member, for fixed securement to the latter.

The pole connecting structure, generally designated 37, includes a pair of longitudinally extending, laterally spaced structural members or channels 73 located at the rearward region of central structure 35, and arranged in facing relation with respect to each other, each having its upper surface, or the upper surface of its upper flange, extending along and welded or otherwise fixedly secured in facing engagement with the undersurface of the lower flange of a respective channel 40. As appears in the drawings, the longitudinally extending structural members or channels 73 of the pole connecting structure are preferably considerably deeper than the channels 40 of the central structure. Also, the channels 73 have their rearward ends substantially flush with the rearward ends of the channels 40, and extend forward therefrom, terminating in the region beneath the lateral structural member 46 in a forwardly and upwardly tapering portion 74. Each of the channels 73 is provided interiorly thereof with a rearward pair of vertically extending, forwardly and rearwardly spaced, facing plates 75, and a forward pair of vertically extending, facing, forwardly and rearwardly spaced plates 76. That is, the pairs of plates 75 and 76 are welded or otherwise fixedly secured to the channels 73. Further, the plates 75 and 76 of each channel are formed with generally semicircular cutouts 77 and 78, respectively, which cutouts face laterally inward and are in horizontal, forward and rearward alignment. There may be provided a forwardly and upwardly extending flange 79 rigidly secured along the forwardly and upwardly extending front edge of each channel 73; and, a rigidifying structure of normally disposed plates 80 and 81 may be welded or otherwise fixedly secured interiorly of the forward region 74 of each channel 73, the horizontal plate 80 extending generally rearward from an upper portion of the inclined plate or flange 79 spaced below the upper flange of the channel, and the vertical plate 81 depending from the rearward end of plate 80 to the approximate juncture of flange 79 and the lower flange of channel 73. In the vertical web of each channel 73 there are preferably provided a rear pair of vertically spaced apertures 84 opening into the space between the rear cutout plates 77, and a front pair of vertically spaced apertures 85 opening into the space between the front pair of cutout plates 76. Additional apertures 86 may be formed in the vertical web of each channel 73 located in the space intermediate the apertures 84 and 85 to facilitate the attachment of landing gear 30 to the channels.

Secured on the coterminous rearward ends of channels 40 and 73 is a generally flat plate 88, as by welding or other suitable means. The plate 88 is preferably provided with a laterally extending upper flange 89 substantially flush with the upper flanges of channels 40, and a laterally extending lower flange 90, which is substantially flush with the lower flanges of channels 73. Formed in the plate 88 are a pair of laterally spaced, generally circular through openings 91 each in substantial alignment with an aligned group of cutouts 77 and 78.

Secured across the underside of the central structure 35, forwardly of the pole-connecting structure 37, is a generally horizontal sheet or plate 94. Stated otherwise, the generally horizontal sheet or plate 94 extends laterally between the channels 40, and forwardly and rearwardly from the forward extensions 42 to the channels 37, and is welded or otherwise fixedly secured in facing engagement with the undersides of the lower flanges of the channels 40. Further, the plate 94 is preferably provided with an integral rearward extension which declines rearwardly, as at 95, along the forward portions 74 of channels 73 and is secured in facing engagement with the undersides of the flanges 79, terminating substantially at the lower ends of the latter flanges. As the laterally extending I-beam 41 has its lower flange substantially flush with the lower flanges of channels 40, the plate 94 is in facing engagement with the underside of the lower I-beam flange. Also, the coupling element 29 is advantageously fixedly secured to the plate 94 and structural member 41.

The forward region of the central structure 35 is provided with a curved sheet or plate 96 extending laterally between the web extensions 42, and extending forward from the forward end of plate 94 arcuately upward in conforming engagement with the curved edges of extensions 42, to the upper surface thereof 43. The plate 96 is, of course, rigidly secured in position, as by welding or otherwise. A generally flat strip or plate 97 extends laterally between the channel web extensions 42 and has its opposite end portions resting on the shoulders 43 forward of the web of I-beam 47. The plate 97 is also welded or otherwise fixedly secured in position.

The landing gear 30 includes a pair of telescopically expansile and contractile, generally vertically extending and laterally spaced tubular struts 99 arranged on opposite sides of the pole-connecting structure 37 and generally directly beneath the rear lateral structural member 45. More specifically, each of the vertical, extensile and retractile struts 99 includes at its upper end a mounting housing 100 adapted to be fixedly secured to and on the outer side of the web of a respective channel 73, as by bolts 101 extending through the apertures 86. Interiorly of the housing 100 are gears, or similar operating mechanism, for effecting extension and retraction of the struts 99 upon actuation of the handle or crank 102. On the lower end of each strut 99 is carried a pair of ground-engageable elements or wheels 103 for upward movement toward the pole-connecting structure 37 upon retraction of the struts 99, and downward movement away from the pole-connecting structure upon extension of the struts.

The poles 31 are seen in Figure 4 as projecting through the apertures 91 of plate 88, rearward from the pole-connecting structure 37. Further, while only one pole 31 is visible in Figure 4 interiorly of the pole-connecting structure 37, it may be understood that both poles have their forward ends received in the pole-connecting structure in the same manner. More specifically, each pole 31 extends forwardly through a respective opening 91 in the plate 88, thence through the cutouts 77 of rear vertical plates 75, and subsequently through the cutouts 78 of front plates 76 into abutting engagement with vertical plate 81. The poles 31 may be fixedly secured in the pole-connecting structure 37 by welding, or other suitable means, however the preferred securing means is that of U-shaped clamping members 105 and 106 respectively embracing the inner sides of each pole 31 and having threaded end portions extending through and out of apertures 84 and 85. Suitable retaining means, such as internally threaded nuts, are provided on the projecting ends of the U-shaped members 105 and 106 to draw the latter members up tightly and firmly clamp the front pole-end portions in position.

While the rear load-supporting frame 25 may be of any suitable construction, it is preferred to employ a construction similar to that of the front load-supporting frame 28, with certain necessary changes as may be required.

In use, the above-described frame construction has been found highly economical, both from the standpoints of manufacturing costs and maintenance, as well as producing pay-load economies by being of relatively light weight. Also, the subject frame construction has been found admirably well suited for carrying extremely heavy and very long loads, such as structural beams and girders for bridge work and the like.

In Figure 1 it may be observed that the load may be considered as being directly over the fifth-wheel structure 15, so as to be carried by the latter. However, in the detached-trailer condition, the load is directly over and carried by the landing gear 30. The longitudinally extending central structure 35 is admirably well suited to accommodate this shift in transmission of the load force. Further, the structural reinforcement of the rear portion of central structure 35, as accomplished by the relatively deep channels 73 of the pole-connecting structure 37, provides a highly effective means for supporting extremely heavy loads without the use of the tractor. As the upper surfaces of the lateral structure 36 are spaced above the upper surfaces of the central structure 35, the lateral structure defines a platform in direct supporting engagement with the load. Thus, the load forces are received initially by the lateral structure 36, and distributed thereby for a less concentrated transmission to the central structure 40.

As is believed apparent, the sockets defined within the cutouts 51 and 56 are adapted to receive removable, upstanding posts for limiting engagement with a load, thereby preventing lateral displacement of the load beyond the load-supporting structure. Further, the tubes 65 and 69, and their registering apertures, provide means for receiving chains or lines to tie a load in position on the supporting structure.

From the foregoing, it is seen that the present invention provides a trailer construction which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A load supporting frame for a pole trailer comprising, a pair of generally horizontal longitudinally extending laterally spaced central structural members fixedly secured together, a plurality of generally horizontal transversely extending structural members fixedly secured to and extending laterally outward beyond opposite sides of said pair of central structural members for direct supporting engagement with a load, a pair of generally horizontal facing channels respectively extending along the underside of and fixedly secured to said pair of central structural members, a pair of generally vertically extending parallel spaced plates fixedly secured in each of said channels, each of said plates being formed with a laterally inwardly facing cut-out with the cut-outs of each pair of plates being in substantial horizontal alignment longitudinally of the adjacent channel for receiving a trailer pole, said channels each being formed in its web in the space between the adjacent pair of vertically extending plates with a pair of vertically spaced through apertures, and a generally U-shaped clamping member extending through each of said pair of apertures and adapted to embrace and firmly retain a trailer pole received in the adjacent cut-outs.

2. A load supporting frame according to claim 1, in combination with an end plate fixedly secured in position extending between and across the ends of said channels, said end plate having a pair of openings each in alignment with an aligned pair of said cut-outs for receiving trailer poles extending through said openings into said cut-outs.

3. A load supporting frame according to claim 1, said channels being located adjacent to one adjacent pair of ends of said central structural members, ground engageable means depending from said channels and mounted for generally vertical movement into and out of supporting engagement with a ground surface, and coupling means connected to said central structural members adjacent to the opposite ends thereof for attachment to the fifth wheel of a tractor.

4. A load supporting frame according to claim 1, said channels being located adjacent to one pair of adjacent ends of said central structural members, an end plate fixedly secured in position extending between and across the ends of said channels adjacent to said one pair of adjacent ends of said central structural members, and an abutment plate fixed in each of said channels in position for abutting engagement with the ends of trailer poles received in said cut-outs.

References Cited in the file of this patent

UNITED STATES PATENTS

| | | |
|---|---|---|
| 1,574,468 | Clement | Feb. 23, 1926 |
| 2,197,401 | Weber | Apr. 16, 1940 |
| 2,419,442 | Dorsey | Apr. 22, 1947 |
| 2,727,758 | Smith | Dec. 20, 1955 |

FOREIGN PATENTS

| | | |
|---|---|---|
| 137,943 | Australia | July 13, 1950 |